United States Patent

[11] 3,563,200

[72] Inventor Saul Grossman
Hartford Road, Moorestown, N.J. 08057
[21] Appl. No. 874,766
[22] Filed Nov. 7, 1969
[45] Patented Feb. 16, 1971

[54] REAR END PARKING GUIDE FOR AN AUTOMOBILE
6 Claims, 7 Drawing Figs.
[52] U.S. Cl............................................. 116/28,
24/259, 33/46, 248/41
[51] Int. Cl............................................. B60q
[50] Field of Search............................. 116/28, 28
(A), 31, 63, 63 (P), 173, 174, 175; 33/46.1;
24/243.2, 259 (RC), 257, 255, 813, 81 (PC), 255
(VA); 248/38, 39, 40, 41

[56] References Cited
UNITED STATES PATENTS

| 1,463,409 | 7/1923 | Theiss | 248/41 |
| 1,811,494 | 6/1931 | Conway | 33/46 |
| 1,859,599 | 5/1932 | Quinn | 116/173 |
| 2,035,880 | 3/1936 | Goodale | 116/31 |
| 3,260,486 | 7/1966 | Groff | 248/41 |

FOREIGN PATENTS

| 609,843 | 5/1926 | France | 248/41 |

Primary Examiner—Louis J. Capozi
Attorney—Robert K. Youtie

ABSTRACT: A specifically configured clip for selective engagement with the rear or side edge of a trunk lid, and a rod to be clamped at one end by the clip for extension upward therefrom to the driver's line of sight to facilitate visual location by the driver of the rearward automobile region.

Patented Feb. 16, 1971
3,563,200
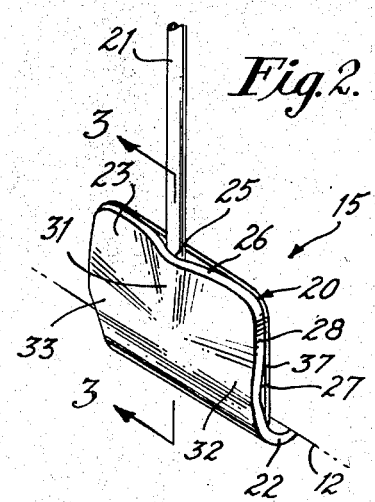
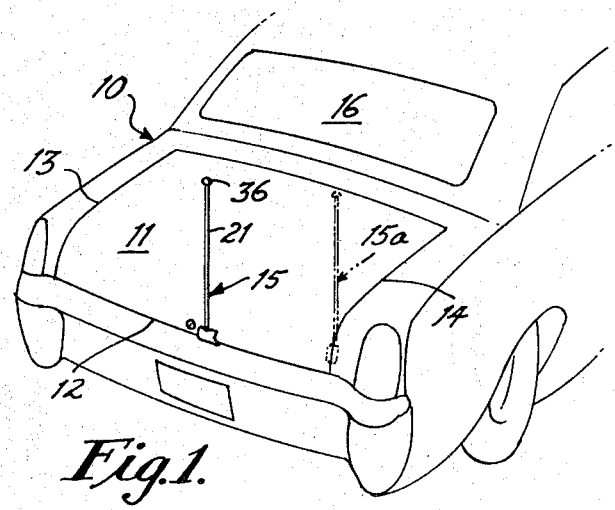
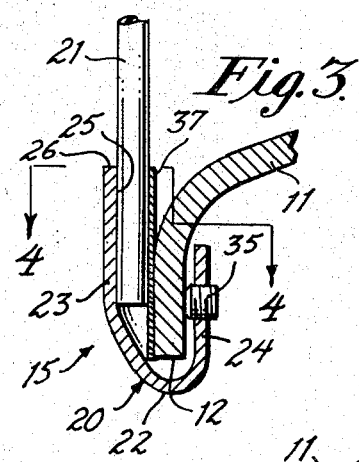
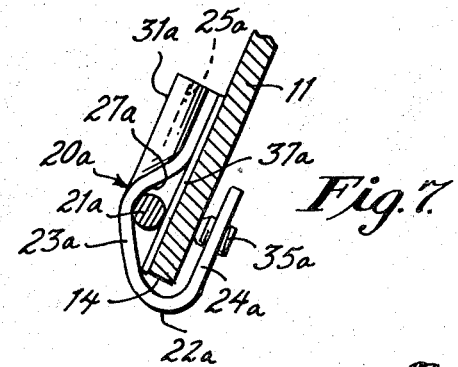
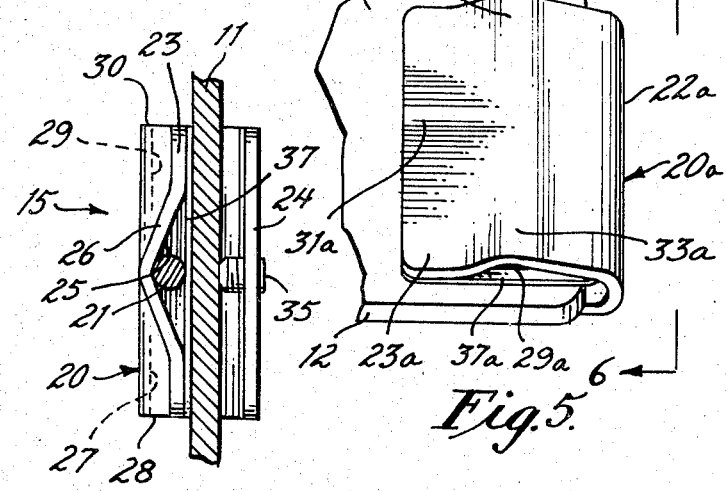
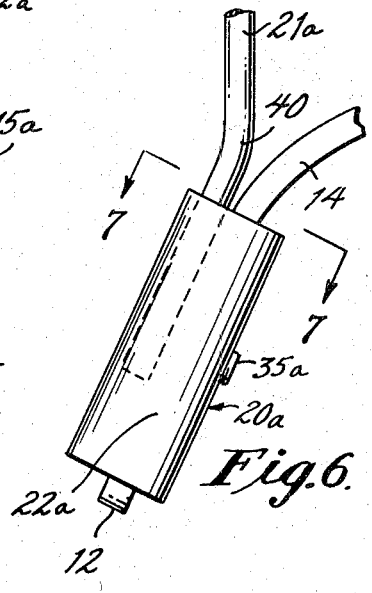
INVENTOR.
SAUL GROSSMAN
BY Robert K. Youtie
ATTORNEY.

REAR END PARKING GUIDE FOR AN AUTOMOBILE

BACKGROUND OF THE INVENTION

While it is appreciated that a wide variety of parking guides for automobiles have been proposed in the past, such devices have not been entirely satisfactory, and have therefore not found wide acceptance and use. Prior parking guides have attacked the problem in different ways, including the making of noise upon close approach to obstacles, the provision of complex optical systems permitting driver observation of the curb or other obstruction, and other approaches. The instant device is concerned with facilitating the driver's visual location of the vehicle extremities, although the vehicle extremities are not directly visible to the driver.

While this overall concept is not new, prior parking guides of this general type were lacking in versatility, so as to be usable only with certain styles and types of cars, and at only certain locations thereon. Further, prior parking guides of the instant type were relatively expensive to manufacture, unsightly and distracting in aesthetic effect, and relatively difficult to apply and use.

SUMMARY OF THE INVENTION

Accordingly, it is an important object of the present invention to provide a parking guide for an automobile which overcomes the above-mentioned difficulties, is extremely simple and economical to manufacture, capable of application to and use in conjunction with an extremely wide variety of shapes, sizes and styles of automobile vehicles, being adapted for quick and easy securement thereto, all without detracting from the overall aesthetic appearance of the vehicle, as designed.

It is still another object of the present invention to provide a parking guide having the advantageous characteristics mentioned in the preceding paragraph, which is extremely simple in construction, durable and reliable in operation to serve a long useful life, and which is very conveniently used as a rear end parking guide to effectively indicate to the driver the location of the rear end of his vehicle.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a partial rear perspective view illustrating an automotive vehicle having a rear end parking guide of the instant invention employed in conjunction therewith and illustrating in phantom an alternative employment of the instant device.

FIG. 2 is a partial perspective view similar to FIG. 1, enlarged for clarity.

FIG. 3 is a sectional elevational view taken generally along the line 3—3 of FIG. 2.

FIG. 4 is a horizontal sectional view taken generally along the line 4—4 of FIG. 3.

FIG. 5 is a partial rear elevational view illustrating in greater detail the alternative position shown in phantom in FIG. 1.

FIG. 6 is a partial side elevational view taken generally along the line 6—6 of FIG. 5.

FIG. 7 is a sectional view taken generally along the line 7—7 of FIG. 6.

DESCRIPTION OF THE PREFERRED EMBODIMENT

Referring now more particularly to the drawings, and specifically to FIG. 1 thereof, a motor vehicle or automobile is there generally designated 10, and includes a trunk lid 11, all of which may be conventional. The trunk lid is formed with a rear edge 12, and a pair of left and right side edges 13 and 14.

A parking guide of the present invention is generally designated 15 and illustrated as applied to the rear edge 12 of the trunk lid 11, upstanding therefrom into the driver's line of sight, as through the rear vehicle windows 16. An alternative position of the parking guide is generally designated 15a in FIG. 1, as applied to a side edge 14 of the trunk lid 11, and upstanding therefrom.

The parking guide 15, being detachably secured to the rear trunk lid edge 12, is seen in greater detail in FIGS. 2, 3 and 4. It will there be apparent that the parking guide 15 includes a clip generally designated 20 which is detachably secured in embracing engagement with the rear trunk lid edge 12, and a rod or standard 21 which upstands from the clip 20.

More specifically, the clip 20 is advantageously fabricated from sheet metal, such as one-eighth inch aluminum stock, or the like, say being formed from a generally rectangular sheet and folded or bent upon itself as at the bight portion 22. That is, the generally U-shaped bight portion 22 extends entirely across the sheet material of clip 20 to subdivide the latter into a pair of generally rectangular outer and inner walls 23 and 24 disposed in facing spaced relation with respect to each other. The wall 23 of clip 20 may be of an area greater than that of wall 24, extending a greater distance from the bend or bight portion 22, as is best seen in FIG. 3.

In addition, the relatively large, outer wall 23 of the clip 20 is formed with a plurality of grooves facing inwardly or toward the inner wall 24. The grooves are disposed in angular relation with respect to each other. In particular, a groove 25 extends generally normal to the bight or bend 22, opening away from the bight through the edge 26 of wall 23. An additional groove 27 is formed in the wall 23, facing inwardly therefrom and extends generally parallel to or longitudinally of the bend 22, opening through the sheet material edge 28. An additional groove 29 may be formed in alignment with the groove 27, also facing inwardly from the wall 23, and opening through the wall edge 30 opposite to the edge 28.

The grooves 25, 27 and 29 may advantageously be formed by creasing the wall 23, say along creases 31, 32 and 33, see FIG. 2.

The inner wall 24 may be provided with a clamping element 35, say in the form of a setscrew extending in threaded engagement through the inner wall.

As best seen in FIGS. 3 and 4, the clip 20 is illustrated in embracing engagement with the trunk lid edge 12, the lid edge being received in the bight portion 22 of the clip. In this condition of attachment, the bight portion 22 extends generally horizontally, and the crease 31 and its associated groove 25 extends generally vertically. The standard, post or rod 21 may have its lower end engaged in the groove 25, and extend generally vertically upward therefrom, terminating at its upper end in an enlargement 36 for ready visual recognition.

In practice, the standard 21 may be fabricated of one-eighth inch rod stock, say plated drill rod, or other suitable material. The rod diameter or thickness is preferably at least equal to or slightly greater than the depth of each of the grooves 25, 27 and 29, for purposes appearing presently.

In addition, a sheet of soft flexible sheeting 37, say of plastic, is applied to the inner surface of the outer wall 23. More specifically, the sheeting 37 may be adhesive coated on one face, and thereby adhesively secured to the inner surface or facing side of the wall 23. Further, the sheeting 37 may extend in bridging relation across the grooves 25, 27 and 29, which condition is best seen in FIGS. 2 and 4. As seen in FIGS. 3 and 4, the rod or standard 21 has its lower end portion engaged in groove 25 of wall 23, and the flexible protective sheeting 37 extends across the groove and contained rod.

As best seen in the assembled condition of FIGS. 3 and 4, the sheeting 37 provides a protective barrier interposed between the trunk lid 11 on one side and the clip wall 23 and rod 21 on the other side. By rotation of the clamping element or setscrew 35 to tighten the latter, it will be appreciated that the clip wall 23 is drawn toward the trunk lid 11, being held firmly against the rod 21 which is received in the groove 25, and the sheeting 37 being interposed in clamped relation between the rod 21 and the trunk lid 11. It will now be understood that the lower end region of the rod 21 is securely held in position, and that the upper end region 36 is in the driver's line of sight so as to readily locate the rear end region of the vehicle to facilitate the driver's parking maneuvers, and the like.

In FIGS. 5—7 are shown a parking guide of the present invention, which is identical to the parking guide 15, but mounted along a side edge 14 of the trunk lid 11. Thus, the clip 20a may be identical to the clip 20 having a pair of facing, spaced outer and inner walls 23a and 24a, connected together by a bight portion or bend 22a, which extends closely along the side trunk lid edge 14. The outer clip wall 23a is creased, as at 31a normal to the bend 22a, and at 32a and 33a in alignment with each other and generally parallel to the bend 22a. The aligned creases 32a and 33a define grooves 27a and 29a, respectively, while the crease 31a defines a groove 25a. The grooves 25a, 27a and 29a all face inwardly toward the trunk lid 11, and a sheeting 37a of flexible protective material is interposed between the outer wall 23a and the lid 11, being adhesively secured to the inner face of the outer wall in bridging relation with respect to the grooves 25a, 27a and 29a.

A post or upstanding rod 21a has its lower end region engaged in the uppermost or upwardly opening groove, being groove 27a, and clamped therein by the action of clamping element or setscrew 35a against the lid 11, in the same manner as described hereinbefore.

In the alternative position of FIGS. 5—7, should the clip 20a be disposed other than vertically, the rod 21a may be bent, as at 40 in FIG. 6, so as to extend generally vertically for termination in the driver's line of sight. Here again, the flexible adhesive sheeting 37a is interposed between the clip wall 23a and rod 21a on one side, and the trunk lid 11 on the other side, to effectively protect the latter, In addition, the adhesive surface of the sheeting 37a serves to retain the clip 20a and rod 21a is assembled condition, say in storage and transit, and to facilitate attachment to the vehicle, as is also true of the position shown in FIGS. 2—4.

From the foregoing, it is seen that the present invention provides a rear end parking guide which fully accomplishes its intended objects and is otherwise well adapted to meet practical conditions of manufacture, installation and use.

Although the present invention has been described in some detail by way of illustration and example for purposes of clarity of understanding, it is understood that certain changes and modifications may be made within the spirit of the invention.

I claim:

1. A rear end parking guide for an automobile having a rear trunk lid with rear and side edges, said guide comprising a clip fabricated of sheet material and bent upon itself to define a pair of facing walls connected together by a bight portion, said clip being adapted for embracing engagement with a selected rear or side trunk lid edge portion, one of said walls having a first groove portion formed therein extending parallel to said bight portion and a second groove portion formed therein extending perpendicular to said bight portion, a rod having one end portion engageable in a selected one of said grooves for extension upward from said clip to the driver's line of sight, and securing means for detachably securing said clip to the trunk lid.

2. A rear end parking guide according to claim 1, said one wall being creased inwardly to define said grooves.

3. A rear end parking guide according to claim 1, said rod having a diameter at least slightly greater than the depth of each of said grooves for clamped engagement of said rod between said one wall and the trunk lid.

4. A rear end parking guide according to claim 3, said securing means comprising a clamping element carried by the other of said walls for abutting engagement with the lid to hold said one wall against said rod and the latter against the lid.

5. A rear end parking guide according to claim 4, said clamping element comprising a setscrew threadedly engaged through said other wall.

6. A rear end parking guide according to claim 1, in combination with a layer of soft flexible sheeting adhesively secured to the facing side of said one wall and extending across said grooves for interposition between one surface of a trunk lid on one side and said one wall and rod on the other side.